3,378,033
BALANCING MECHANISM
Claiborn Cooley, Jr., Houston, Tex., assignor to
  FMC Corporation, San Jose, Calif., a corporation of Delaware
Filed May 7, 1965, Ser. No. 453,956
14 Claims. (Cl. 137—615)

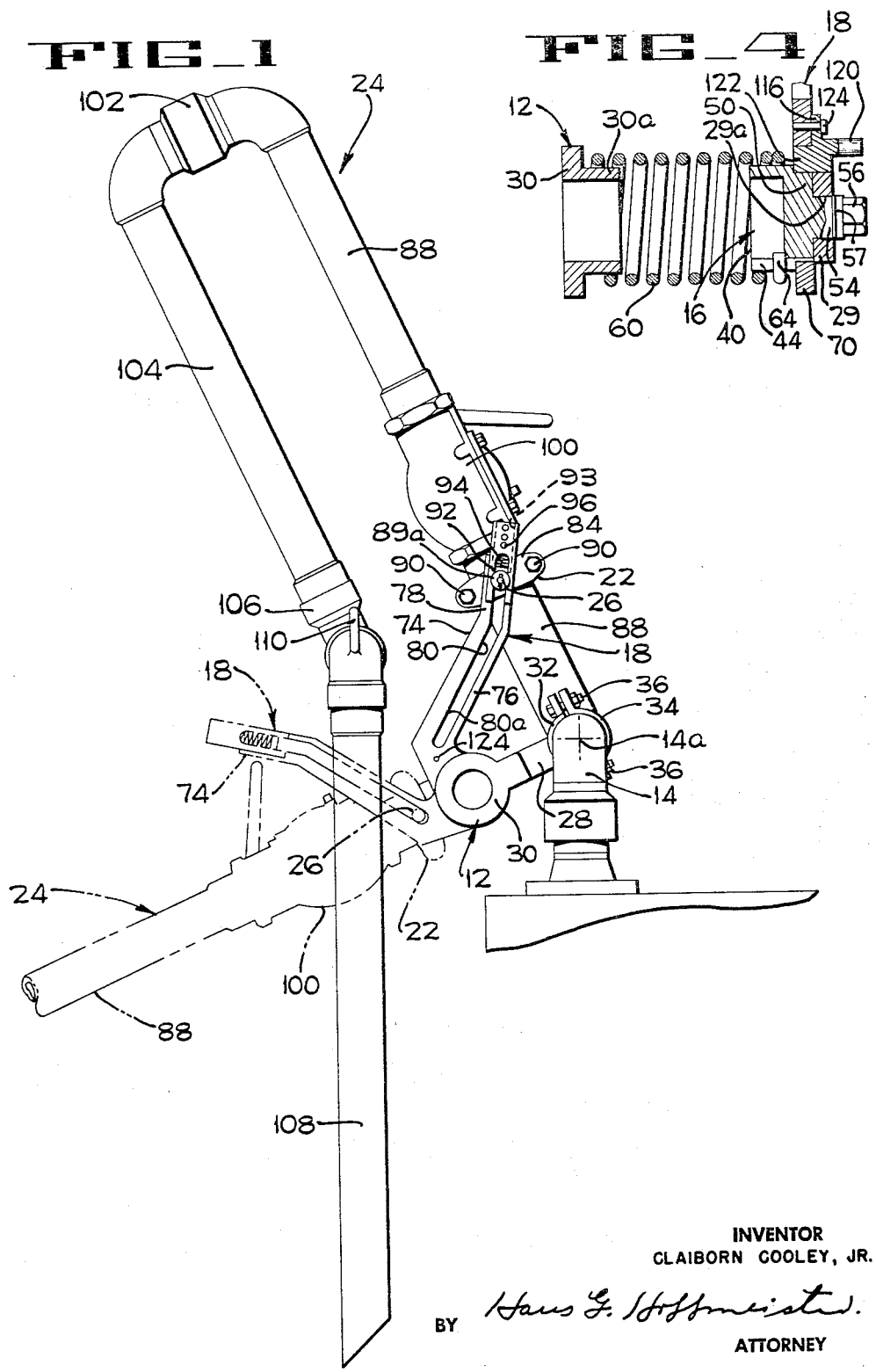

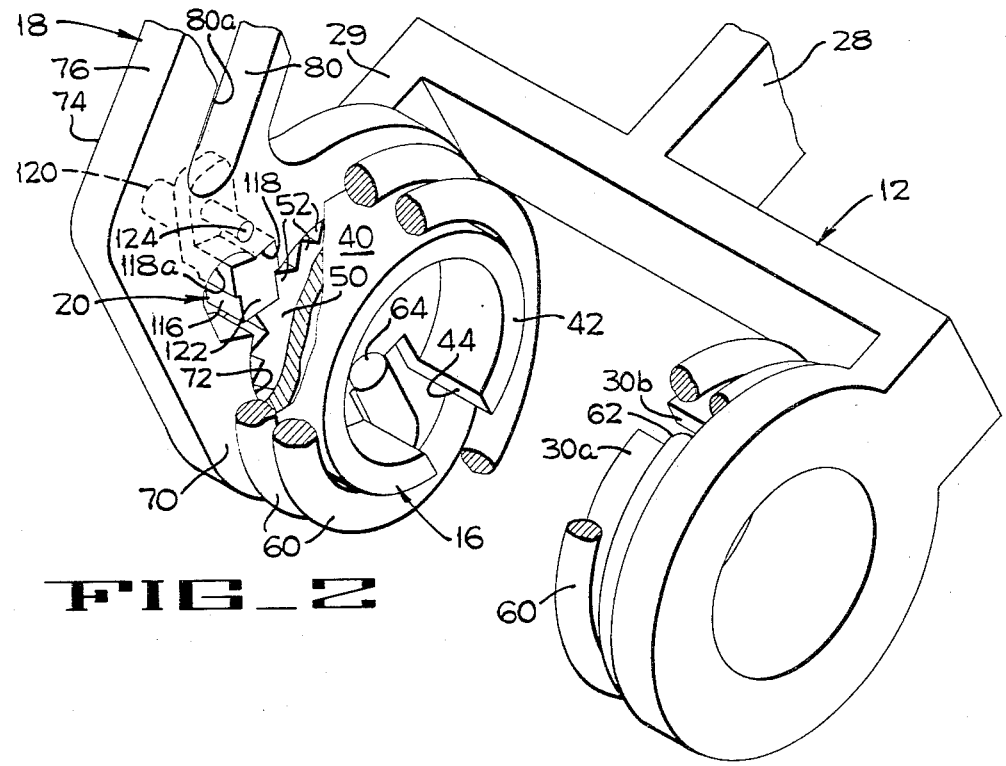
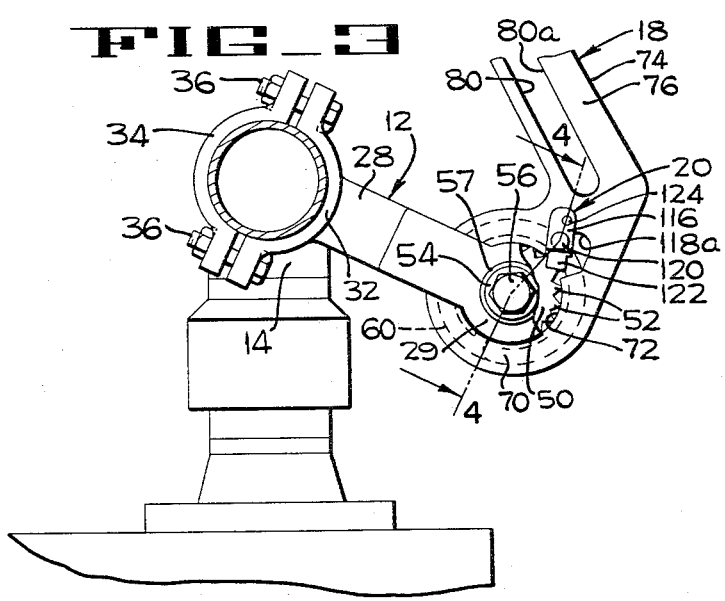
INVENTOR
CLAIBORN COOLEY, JR.

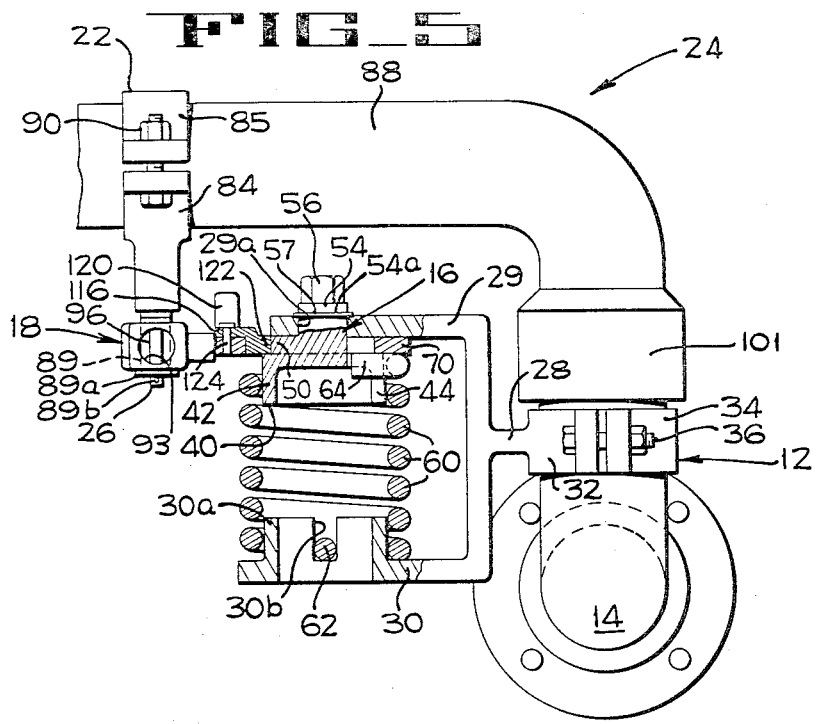
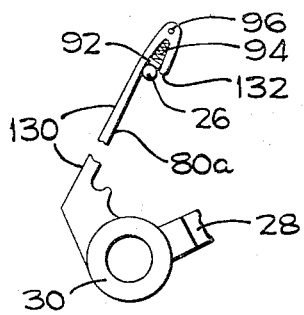

ABSTRACT OF THE DISCLOSURE

A torsion spring balancing mechanism for an articulated material conveying apparatus, such as a loading arm for the transfer of liquids from storage areas to tank trucks and cars, with an improved power lever for transmitting the torsional force exerted by the spring to the apparatus to balance the apparatus in all operating positions, and in one version to also return the apparatus to its stowed position.

---

Loading arms or movable conduits are often extremely heavy and of considerable length such that it is necessary to provide a force to counteract their weight which will permit one operator to readily position the discharge end of the conduit at the inlet of the tanks.

It is an object of the invention to provide an improved balancing mechanism for a material transferring apparatus.

Another object is to provide a balancing mechanism which is readily adjustable to accommodate varying loads.

Another object is to provide a balancing mechanism which is readily adaptable for use on a large variety of differently shaped conduits of varying sizes.

Another object is to provide a balancing mechanism which can be mounted on a loading arm so as not to interfere with operating personnel.

Another object is to provide a balancing mechanism which is releasably clamped to a loading arm.

Another object is to provide a balancing mechanism which can be used without modification for right hand or left hand loading, top or bottom loading, or overhead or underground loading arms.

Another object is to provide a balancing mechanism for a loading arm so that the arm can be adjusted to a wide range of positions.

Another object is to provide a balancing mechanism which is economical in construction and which is adaptable for use on most swivel joints and loading arms currently in use.

These, together with other objects, will become better understood upon reference to the following description and accompanying drawings, in which:

FIGURE 1 is a side elevation of a typical loading arm and a balancing mechanism embodying the present invention.

FIGURE 2 is an enlarged isometric, with parts broken away, of the spring powered portion of the balancing mechanism shown in FIGURE 1.

FIGURE 3 is an enlarged side elevation of a portion of the balancing mechanism shown in FIGURE 1, as viewed from the opposite side of FIGURE 1.

FIGURE 4 is a section of the spring powered portion of the balancing mechanism taken along the lines 4—4 of FIGURE 3.

FIGURE 5 is a plan of a portion of the balancing mechanism with parts broken away.

FIGURE 6 is a schematic illustration of a modified form of a portion of the subject balancing mechanism.

In general, by referring to FIGURE 1, it can be seen that the balancing mechanism comprises a clamp bracket 12 fastened on a riser pipe or support 14 which communicates with a storage area, not shown. The clamp bracket 12 supports a spring power assembly 16, a power lever 18 and a locking assembly 20 (FIG. 3). A guide bracket 22 is mounted on a movable loading arm 24 and supports a guide pin 26 which connects the power lever to the guide bracket.

More particularly, the clamp bracket 12 is best described by referring to FIGURES 2, 3, 4 and 5. The bracket 12 comprises a support bar 28 which has formed at one end a set of opposed, spaced arms 29 and 30. The arm 29 is provided with a central aperture 29a (FIG. 5) and the arm 30 is provided with a cylindrical projection or spring anchor 30a having a longitudinal slot 30b. Formed on the opposite end of the bar 28 is a circular segment 32 that fits tightly against the outer cylindrical surface of the riser pipe 14. A mating circular clamp 34 (FIG. 3) fits tightly against the outer cylindrical surface of the riser pipe 14 in confronting relation to the circular segment 32. The clamp and the segment are adjustably connected in pipe gripping engagement by sets of connecting bolts and nuts 36. The clamp bracket 12 can be arranged at any desirable location on the pipe 14 and when tightened in place by the bolts and nuts 36 supports the spring power assembly 16 in an effective loading arm supporting position.

The spring power assembly 16 will now be described and as best shown in FIGURES 2 and 4 comprises a spring axle 40 which is formed of a cylindrical element 42 having a longitudinal slot 44 at its inner end or right end as viewed in FIGURE 2. The outer end or left end as viewed in FIGURE 2, of the cylindrical element 42 comprises a first reduced portion or member 50 having a plurality of circumferentially spaced teeth 52 (for a purpose later to be described) and a cylindrical shank portion 54 (FIG. 4) of a still smaller diameter which extends axially outwardly from said first reduced portion 50. The shank portion 54 fits snugly in the central hole 29a of the spaced arm 29 and ends outwardly of the arm 29 in an adjusting head 56. A retaining ring 57 (FIG. 4) fits in a circumferential groove 54a on the shank 54 and extends outwardly radially therefrom to engage the outer surface of the arm 29 and thus retain the spring axle 40 against longitudinal movement. A helical torsion spring 60 is mounted over the outer surface of the cylindrical element 42 and the spring anchor 30a, respectively, and ends in a pair of radially inwardly bent end portions 62 and 64 which extend into the slots 30b and 44, respectively. When the adjusting head 56 is turned clockwise, as viewed in FIGURE 3, the spring axle 40 including the slot 44 are turned and the torsion spring 60 is tensioned. Tensioning the spring 60 provides the force necessary to counteract the moment of the loading arm 24 in a manner to be later described.

The power lever 18 will now be described and as best shown in FIGURES 1 and 2 comprises a cylindrical base 70 (FIG. 2) having a bore 72 of a diameter just greater than the diameter of the first reduced portion 50 of the spring axle 40. A lever arm 74 extends outwardly from the cylindrical base 70 and has a straight portion 76 and a distal bent portion 78 (FIG. 1). A longitudinal slot 80 is provided in the arm 74 and has a smooth bearing wall 80a which is constantly urged by the torsion spring 60 against the aforementioned guide pin 26 which is positioned to extend through the slot 80. The power lever 18 serves to transfer the force from the spring 60 to the movable loading arm 24.

As is best shown in FIGURE 1, the guide pin 26 is supported in a position to extend through the slot 80 by the guide bracket 22. The guide bracket 22 comprises a circular support segment 84 and a circular clamp 85 (FIG. 5) which is identical to the circular clamp 34 of the clamp bracket 12. The guide bracket 22 is positioned on a first movable conduit 88 which is part of the loading arm 24, in a manner such that the longitudinal axis of the guide pin 26 is normal to the bearing surface 80a of the power lever 18. The positioning is accomplished by tightening a set of nuts and bolts 90 which connect the support segment 84 and the circular clamp 85 of the guide bracket 22 in a manner similar to that employed in the clamp bracket 12. The guide pin 26 is integral with the circular support segment 84 and is circumscribed by a hard roller 89 which reduces friction and wear. The roller is retained on the pin by a washer 89a and a retaining pin 89b. The washer and pin also serve to properly guide the power lever 18. Thus the force from the power lever is transmitted through the roller 89 and the pin 26 to the conduit 88 of the loading arm 24.

A buffer plate 92 is positioned in a bore 93 which intersects the slot 80 at the distal end of the lever arm 74. The buffer plate is biased against the inner end wall of the bore and in the path of travel of the pin 26 by a spring 94 which is confined within the bore by any suitable, and preferably adjustable fastening element 96. Should the loading arm 24 be thrown upwardly, the buffer plate 92 will be struck by the guide pin 26 and the spring 94 will absorb the shock.

The loading arm 24 will be briefly described and is of a type commonly used in the loading art. The arm comprises the first vertical conduit 88 which is provided with a well known shut-off valve 100. The conduit 88 is fastened at one end to a swivel joint assembly 101 (FIG. 5) which in turn is fastened to the riser pipe 14 in a manner well known in the art. The other end of the movable conduit 88 is fastened to a second swivel joint assembly 102 which in turn is connected to an intermediate conduit 104. The intermediate conduit 104 is connected by way of a third swivel joint assembly 106 to a discharge conduit 108 which directs the flow of fluids from the loading arm 24 into a receiving tank car or tank truck, not shown. A handle 110 is fastened on the third swivel joint assembly 106 for assisting an operator in moving the loading arm.

The locking assembly 20 will now be described and as best shown in FIGURES 2, 3 and 4 comprises a pawl 116 fitted into a groove 118 in the cylindrical base 70 of the power lever 18. The pawl 116 has a handle portion 120 for removing the pawl from the groove 118 and a tooth engaging portion 122 which fits snugly between adjacent teeth 52 of the first reduced portion 50 of the spring axle 40. The cylindrical base 70 is drilled to receive a pin 124 passing through the pawl 116 which acts as a pivot for limited oscillation of the pawl. The groove 118 is cut away as at 118a (FIGS. 2 and 3) in a manner such that counterclockwise rotation of the spring axle 40, as viewed in FIGURE 2, will allow the tooth engaging portion 122 of the pawl 116 to pivot into the cut out portion 118a, permitting the teeth 52 to pass the pawl and release tension on the spring 60. However, clockwise movement of the spring axle 40, as viewed in FIGURE 2, will cause the teeth 52 to engage the tooth engaging portion 122 of the pawl and force it against the surface of the groove 118 to prevent opposite or clockwise rotation of the spring axle 40. Thus the spring 60 may be tensioned by turning the head 56 clockwise as viewed in FIGURE 3 until the desired force is attained and then by pivoting the pawl 116 back into engagement with the teeth 52 the desired tension is retained in the spring and the force is transmitted from the spring through the pawl and into the power lever 18.

In the operation of the device, the adjusting head 56 is rotated until the desired tension is attained in the torsion spring 60, namely, a torsion force necessary to balance the weight of the loading arm 24. The pawl 116 is placed in its locking position between the teeth 52 on the spring axle 40, and the spring applies a force to urge the power lever 18 in a clockwise direction, as viewed in FIGURE 1, against the roller 89 and the guide pin 26 to counteract the moment of the loading arm 24 which would normally tend to cause the first movable conduit 88 to rotate counterclockwise, also as viewed in FIGURE 1, about the axis 14a. Since the bearing surface 80a of the slot 80 in the bent portion 78 of the power lever 74 is more nearly vertical than the bearing surface 80a of the slot 80 in the lower straight portion 76 of the lever arm 74, more force is applied per degree of pivotal movement of the conduit 88 when the pin is in the bent portion 78 than when the pin is in the lower portion 76 of the lever arm 74. Thus, when the loading arm is raised to a position where the pin 26 is above the straight portion 76, the loading arm will be forced upwardly into a stowing position with the pin 26 resting against the buffer plate 92. When the loading arm 24 is in a lowered position as shown in phantom in FIGURE 1, the pin 26 is at the innermost end of the straight portion 76. Throughout the movement of the loading arm 24 through intermediate positions with the pin 26 in the straight portion 76, the loading arm will be balanced by the energy stored in the torsion spring 60 such that the loading arm can be stopped in any of these intermediate positions and will be retained in that position by the spring 60 without any assistance from the operator to stabilize it. However, once the loading arm is in a position such that the guide pin is in the bent portion 78 of the lever arm 74, as aforementioned, the loading arm will be urged into its stowing position. Thus, an operator handling the loading arm 24 can, with only slight force, move it into any desirable position and when no longer in use can shove the arm upward into its stowing position causing the guide pin to ride along the bearing surface 80a and strike the buffer plate 92, eventually coming to rest in engagement with the buffer plate.

A modified form of the power lever 18 is shown in FIGURE 6 in the shape of a hook and is identical to the preferred embodiment with the exception that this embodiment has only a straight lever arm 130 with one side of the arm 130 being broken away as at 132. Since the force imposed by the lever arm 130 on the guide pin 26 is always in a clockwise direction as viewed in FIGURE 6, it is not always necessary to provide a wall opposite from the bearing surface 80a. Furthermore, it is also not always necessary that the power lever have a bent portion since the lever arm 130 will still be effective to counteract the weight of the loading arm 24 without such a bent portion.

The operation of the modified form of the invention shown in FIGURE 6 is identical to that of the preferred embodiment with the exception that the lever arm 130 will not urge the loading arm into a stowing position, due to the lack of a bent portion. A further description, therefore, is not believed necessary in view of the similarity of operation.

As can be readily seen the invention provides an effective balancing mechanism for counteracting the weight of a loading arm and has the advantages of maintaining the loading arm in any desired position and positively urging the arm into a stowing position when not in use. The invention has the further advantage of being readily adaptable for use with loading arms of various weights and diameters and is of a structure which is inexpensive to manufacture and easy to maintain.

While the preferred apparatus for carying out the invention has been shown and described, it will be understood that it is capable of modification and variation while still operating according to the principles of the invention. It is to be understood, therefore, that the scope of the invention is limited only by the claims appended hereto.

Having thus described the invention, that which is believed to be new and for which the protection by Letters Patent is desired is:

1. A balancing mechanism for a material conveying apparatus having a member pivotally connected to a support for elevational movement thereon, comprising a power assembly including a torsion spring rigidly connected at one of its ends to said support for supplying a balancing force for said member; a power lever rigidly connected at one of its ends to the other end of said torsion spring for transmitting said balancing force from said spring toward said member; and guide means mounted on said member for transferring said balancing force from said power lever to said member, whereby when said member is raised or lowered said guide means moves along a longitudinal surface of said power lever to thereby vary the effective balancing force exerted on said guide means and maintain said member in balance.

2. The balancing mechanism as defined by claim 1 wherein said power lever is bent.

3. The balancing mechanism defined by claim 2 wherein said power lever has a slot therein and said guide means is slidably mounted within said slot.

4. The balancing mechanism as defined by claim 1 wherein said power lever is hook-shaped and open at one side.

5. The balancing mechanism as defined by claim 1 including means fastened to said power lever to provide a yieldable cushion between said power lever and said guide means.

6. The balancing mechanism as defined by claim 1 including means for adjusting the tension of said spring and means for locking said tension adjusting means in an adjusted position.

7. The balancing mechanism as defined by claim 6 wherein said locking means includes a pawl fastened to said power lever and a circumferentially toothed member which is adapted to be engaged by said pawl.

8. A spring actuated loading assembly comprising a support conduit, a vertically swingable conduit arm pivotably connected to said support conduit, a bracket connected to said support conduit, a spring axle rotatably supported on said bracket and provided with circumferentially spaced teeth, an adjusting member fixed to said axle for rotating said axle, a lever rotatably mounted on said spring axle and circumscribing said teeth, a locking member connected to said lever for engagement with said teeth to lock said lever to said spring axle and prevent movement therebetween, a guide pin connected to said swingable conduit arm and positioned against said lever for longitudinal slidable movement thereon, a torsion spring fixed to said bracket and said axle, whereby said lever arm is urged against said guide pin and balances the downward weight of said swingable conduit arm when said axle is rotated and said locking member is in engagement with said axle teeth.

9. In combination with a vertically swingable conduit pivotably connected to a support conduit, a bracket adjustably fastened to said support conduit, a spring axle rotatably mounted on said bracket, said axle being provided with circumferentially spaced teeth and an adjusting member for rotating said axle, a torsion spring connected to said spring axle at one end thereof and to said bracket at the other end, a lever arm rotatably mounted at one end on said spring axle, a pawl connected to said lever arm adjacent said spring axle for engaging said teeth and for locking said lever arm and said axle for unitary movement, a second bracket adjustably fastened to said swingable conduit, and a guide pin fixed to said second bracket and longitudinally slidably engaging said lever arm, whereby the force imposed on said lever arm by said torsion spring is transmitted to said pin and counteracts the gravitational force applied on said swingable conduit.

10. The apparatus as defined by claim 9 including a buffer plate resiliently mounted on said lever at the other end thereof to provide a yieldable cushion between said pin and said lever.

11. Loading apparatus for transferring material from a storage area to a movable tank comprising a movable loading arm including an inner conduit and a distal conduit, means for applying a force on said inner conduit which is equal to and in a direction opposite to the weight causing downward pivotal movement of said loading arm, said force applying means including a spring biased lever arm having a longitudinal bearing surface, a guide pin fastened to said inner conduit in a position for engaging said bearing surface throughout its length, whereby said pin moves along said bearing surface during movement of said inner conduit thereby to cause the downwardly pivoting weight of said loading arm to be balanced by said spring biased lever arm through all positions of movement of said loading arm.

12. In a material transferring apparatus including a loading arm mounted for elevational movement about a first pivotal axis, a balancing mechanism comprising a lever, means mounting the lever for pivotal movement about a second pivot axis in spaced relation to said first axis, a guide, means mounting the guide on the arm in the path of pivotal movement of the lever for relative slidable movement of the guide and lever during elevational movement of the arm, and means yieldably applying torque to said lever about said second axis and in a direction to force said lever against said guide thereby to counteract the downward movement of the arm about said first axis throughout said elevational movement of the arm.

13. The apparatus of claim 12 wherein said loading arm is mounted on a riser, and wherein said lever and guide mounting means are releasably clamped to said riser and loading arm respectively.

14. The apparatus of claim 12 wherein said second pivot axis is in substantially parallel relation to the first pivot axis and is located on the same side of said first axis as the loading arm during movement of the loading arm from an upper position to a lower position and wherein said lever projects from said second axis and is movable in a plane that is substantially parallel to the plane in which the loading arm moves.

References Cited

UNITED STATES PATENTS

| 2,637,877 | 5/1953 | Hanssen | 16—85 |
| 2,865,045 | 12/1958 | Miller | 16—85 |
| 3,038,714 | 6/1962 | Klaus | 248—292 |

FOREIGN PATENTS 273,177   12/1951   Switzerland.

WILLIAM F. O'DEA, *Primary Examiner.*

H. COHN, *Assistant Examiner.*